(12) United States Patent
Showalter

(10) Patent No.: US 6,347,271 B1
(45) Date of Patent: Feb. 12, 2002

(54) CONTROL STRATEGY FOR REDUCING PRIMARY DRIVE LINE LOADS

(75) Inventor: Dan J. Showalter, Plymouth, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/396,250

(22) Filed: Sep. 15, 1999

(51) Int. Cl.⁷ .......................... G06F 17/00; G06F 19/00
(52) U.S. Cl. ........................ 701/69; 701/67; 701/68; 701/90; 477/5; 477/46; 477/83
(58) Field of Search .................. 701/51, 67, 68, 701/69, 84, 85, 87, 90; 477/5, 46, 83, 181, 905; 123/376, 398

(56) References Cited

U.S. PATENT DOCUMENTS

| | | | |
|---|---|---|---|
| 4,440,042 A | 4/1984 | Holdeman | 475/269 |
| 4,754,834 A | 7/1988 | Ozaki et al. | 180/233 |
| 4,896,268 A | 1/1990 | MacGugan | 701/220 |
| 4,908,767 A | 3/1990 | Scholl et al. | 701/220 |
| 5,152,362 A | 10/1992 | Naito | 180/248 |
| 5,166,879 A * | 11/1992 | Greene et al. | 701/62 |
| 5,247,466 A | 9/1993 | Shimada et al. | 701/124 |
| 5,303,797 A | 4/1994 | Niikura | 180/248 |
| 5,510,982 A * | 4/1996 | Ohnishi et al. | 701/55 |
| 5,609,219 A | 3/1997 | Watson et al. | 180/248 |

\* cited by examiner

Primary Examiner—Gertrude Arthur
(74) Attorney, Agent, or Firm—Brinks, Hofer, Gilson & Lione; Greg Dziegielewski

(57) ABSTRACT

An apparatus and method of operating an adaptive drive system of a motor vehicle which reduces drive line wear, improves safety margins and permits weight reduction in drive line components activates a clutch between a primary and secondary drive line when the vehicle is determined to be heavily loaded. The method steps include sensing the position of a throttle position sensor, sensing the instantaneous speed of a motor vehicle and computing instantaneous acceleration, determining whether the ratio of vehicle acceleration to throttle position is less than predetermined threshold value and engaging a transfer case clutch to transfer drive torque from a primary drive line to a secondary drive line. Operation of this method is transparent to the driver inasmuch as the clutch is activated when the vehicle is heavily loaded as determined by the throttle position to acceleration ratio.

24 Claims, 4 Drawing Sheets

CONTROL STRATEGY FOR REDUCING PRIMARY DRIVE LINE LOADS

BACKGROUND OF THE INVENTION

The invention relates generally to an operating strategy for motor vehicles having part time or adaptive drive systems and more particularly to an operating strategy for motor vehicles having part-time or adaptive drive systems which activates the drive system clutch in certain operating conditions when the vehicle is heavily loaded.

The design of motor vehicles and motor vehicle drive line components routinely addresses worst case scenarios. Operation and handling of the vehicle when it is loaded to the maximum, operation and stability of the vehicle at maximum operating speeds, operation and cooling of the vehicle at a maximum design ambient temperature and operation and performance of the vehicle under maximum braking conditions are all familiar concerns of motor vehicle design and test engineers. For example, rear axles, rear differential gearing, particularly the hypoid gears of a differential, and the rear prop shaft in an adaptive four-wheel drive vehicle must all be designed to withstand maximum engine torque since the vehicle will most generally be operated in two-wheel drive.

While the vehicle must perform competently, satisfy numerous operating parameters under these extreme conditions and component parts must be designed to survive them, it is acknowledged that few vehicles are subjected to such operating maximums and fewer still for repeated events or extended periods of time. This observation suggests that operational modes may be developed which are activated or engage only during extreme operating conditions which may then reduce loading, fatigue and wear on parts subjected to such operating extremes, thereby permitting designs which are smaller and lighter but which still provide the appropriate load carrying capability and safety margins for extreme operating conditions.

The present invention is directed to a drive line operating strategy which provides improved vehicle operation and durability while allowing reductions in the size and hence weight of certain drive line components.

SUMMARY OF THE INVENTION

An apparatus and method of operating an adaptive drive system of a motor vehicle which reduces drive line wear, improves safety margins and permits weight reduction in drive line components, activates a clutch between a primary and secondary drive line in certain operating conditions when the vehicle is determined to be heavily loaded. Heavy vehicle loading is determined through data manipulation from sensors typically already available in a vehicle. The operating method may be added to programs or subroutines in an adaptive system controller and may operate automatically, i.e., without driver intervention.

The steps of the method include sensing the position of a throttle position sensor, sensing instantaneous speeds of a motor vehicle and computing instantaneous acceleration, determining whether the ratio of vehicle acceleration to throttle position is less than a predetermined threshold and engaging a transfer case clutch to transfer drive torque from a primary drive line to a secondary drive line.

Operation of this method is transparent to the driver inasmuch as the clutch is activated only when the vehicle is heavily loaded as determined by the acceleration to throttle position ratio. Once activated, the clutch preferably remains activated for the duration of an ignition cycle.

Operation of the motor vehicle drive line according to this method may be accompanied by a reduction in the size of various primary drive line components such as the differential hypoid gears, the primary drive shaft and the primary axles due to their reduced maximum torque loading thereby not only lowering their cost but also reducing the weight of the vehicle.

Thus it is an object of the present invention to provide an operating strategy for an adaptive drive system of a motor vehicle.

It is a further object of the present invention to provide an operating strategy for a transfer case clutch of adaptive drive system of a four-wheel drive motor vehicle.

It is a still further object of the present invention to provide an operating strategy for an adaptive drive system of a motor vehicle wherein acceleration and throttle position are detected and utilized to control engagement of an adaptive drive system clutch.

It is a still further object of the present invention to provide an operating strategy for an adaptive drive system of a motor vehicle through which heavy passenger and/or cargo loading of a motor vehicle may be determined by sensing acceleration and throttle position.

It is a still further object of the present invention to provide an operating strategy for an adaptive drive system of a motor vehicle which engages a drive line clutch during certain operating conditions upon a determination that the vehicle is heavily loaded.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
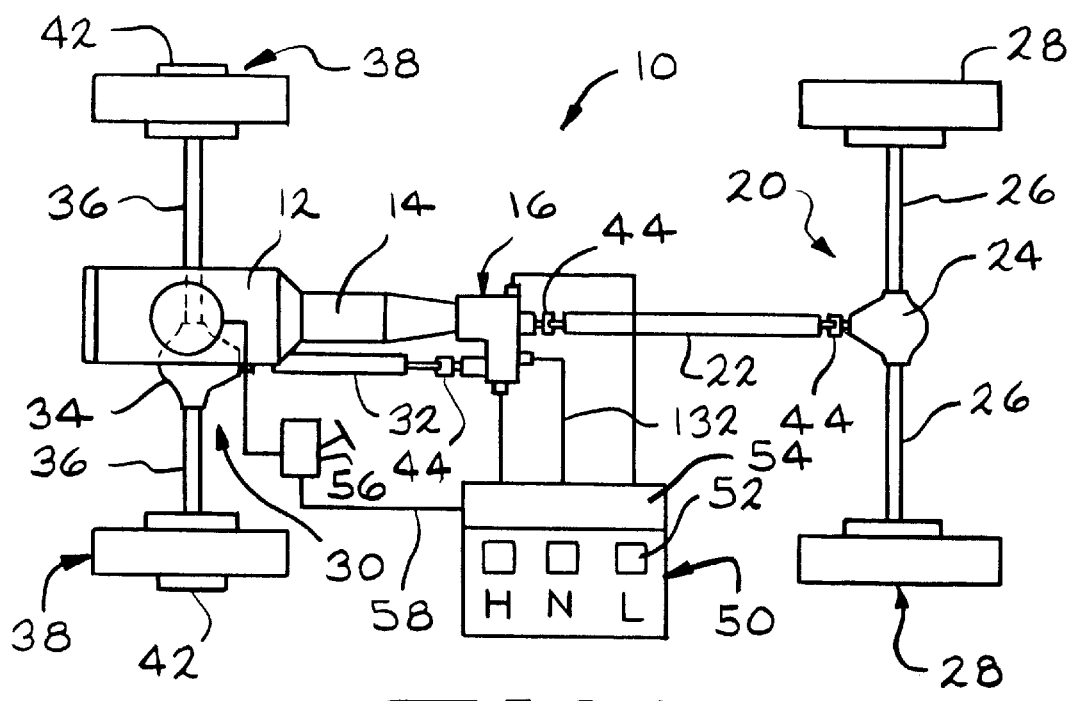
FIG. 1 is a diagrammatic view of an adaptive four-wheel drive motor vehicle power train having a transfer case and controller according to the present invention.

Referring now to FIG. 1, a four-wheel vehicle drive train is diagrammatically illustrated and designated by the reference number 10. The four-wheel vehicle drive train 10 includes a prime mover 12 which is coupled to and drives a transmission 14. The output of the transmission 14 directly drives a transfer case assembly 16 which provides motive power to a rear or primary drive line 20 comprising a rear or primary prop shaft 22, a rear or primary differential 24, a pair of live rear or primary axles 26 and a respective pair of rear or primary tire and wheel assemblies 28.

The transfer case assembly 16 also selectively provides motive power to a front or secondary drive line 30 comprising a front or secondary prop shaft 32, a front or secondary differential assembly 34, a pair of live front or secondary axles 36 and a respective pair of front or secondary tire and wheel assemblies 38. The front tire and wheel assemblies 38 may be directly coupled to a respective one of the secondary axles 36, as noted, or, if desired, a pair of manually or remotely activatable locking hubs 42 may be operably disposed between the secondary axles 36 and a respective one of the tire and wheel assemblies 38 to selectively connect same. Alternatively, center axle disconnects (not illustrated) may be disposed in the secondary differential assembly 34. Finally, both the primary drive line 20 and the secondary drive line 30 may include suitable and appropriately disposed universal joints 44 which function in conventional fashion to accommodate static and dynamic offsets and misalignments between the various shafts and components.

A control assembly 50 having a plurality of push buttons 52 which correspond to the various driver selectable operating modes of the transfer case assembly 16 such as high, neutral and low may be mounted within the passenger cabin in a location proximate the driver of the motor vehicle. If desired, the push buttons 52 may be replaced by a rotary switch or other analogous driver selectable input device. The control assembly 50 includes a microprocessor or microcontroller 54 which includes input devices which receive signals, condition them, undertake computations and provide control outputs and logic decisions based upon feedback or signals provided by components of the transfer case assembly 16. Typically, such conditioning, computation and logic decisions will be performed by software stored in non-volatile memory devices. A throttle position sensor 56 provides either an analog or digital signal to the microcontroller 54 in a data line 58 representative of the instantaneous position of the throttle.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a primary rear wheel drive vehicle.

These designations "primary" and "secondary" are utilized herein rather than "front" and "rear" inasmuch as the invention herein disclosed and claimed may be readily utilized with transmissions 14 and transfer cases 16 wherein the primary drive line 20 is disposed at the front of the vehicle and the secondary drive line 30 is disposed at the rear of the vehicle, the designations "primary" and "secondary" thus broadly and properly characterizing the function of the individual drive lines rather than their specific locations.

Figure 2:
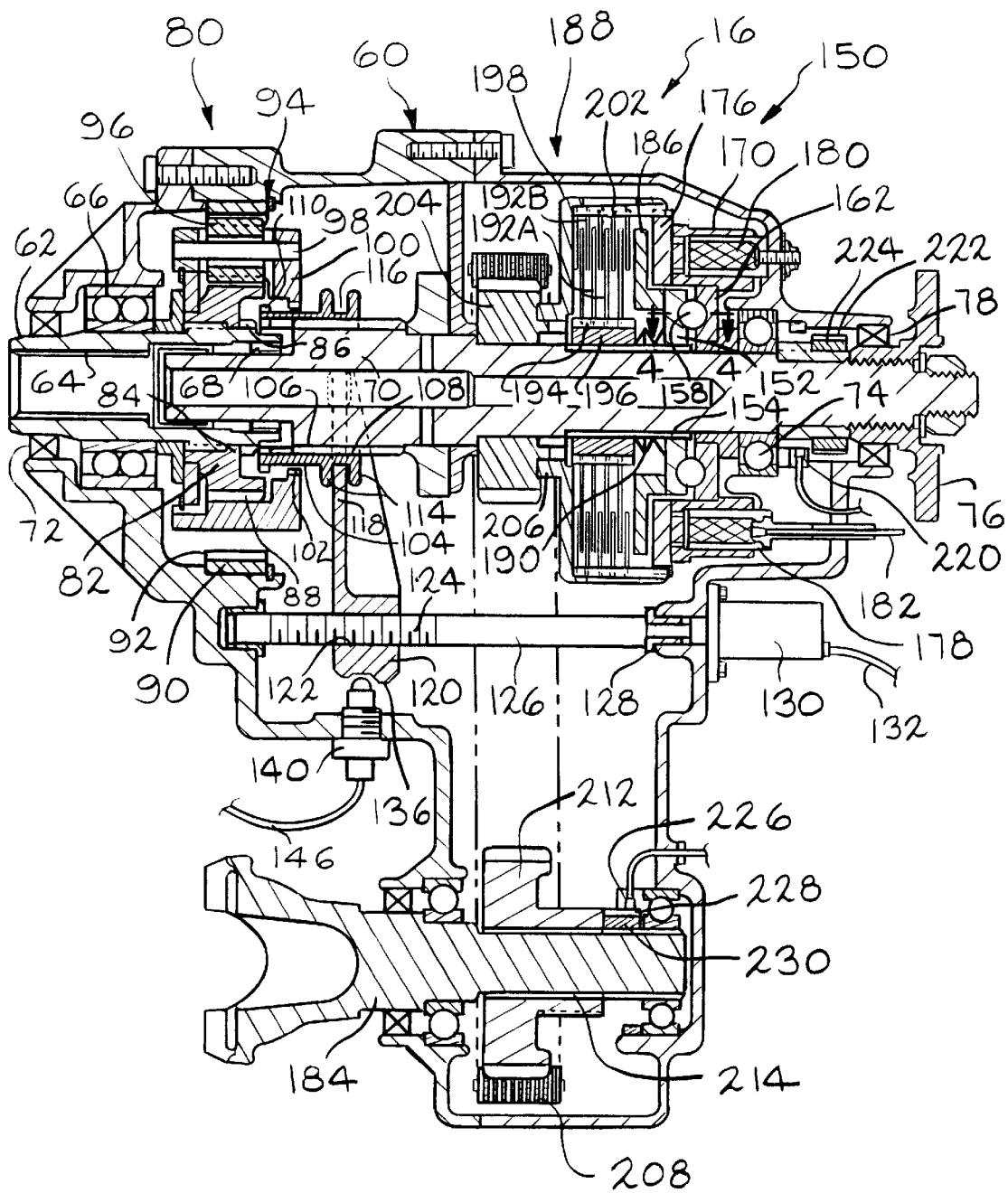
FIG. 2 is a full, sectional view of a transfer case according to the present invention.

Referring now to FIGS. 1 and 2, the transfer case assembly 16 includes a multiple piece housing assembly 60 having mating sealing surfaces, openings for shafts and bearings and various recesses, shoulders, counterbores and the like to receive various components or assemblies of the transfer case 16. An input shaft 62 includes female or internal splines or gear teeth 64 or other suitable coupling structures which drivingly couple the output of the transmission 14 illustrated in FIG. 1 to the input shaft 62. The input shaft 62 is rotatably supported at one end by an anti-friction bearing such as a ball bearing assembly 66 and at its opposite end by an internal anti-friction bearing such as a roller bearing assembly 68. The roller bearing assembly 68 is disposed upon a portion of a stepped output shaft 70. A suitable oil seal 72, positioned between the input shaft 62 and the housing assembly 60, provides an appropriate fluid tight seal therebetween. The opposite end of the output shaft 72 is supported by an anti-friction bearing such as a ball bearing assembly 74 and include a flange 76 which may be a portion of a universal joint 44 or may be secured to associated drive line components such as the primary prop shaft 22. A suitable oil seal 78, disposed between the flange 76 and the housing assembly 60 provides an appropriate fluid tight seal therebetween.

The transfer case assembly 16 also includes a two-speed planetary gear drive assembly 80 disposed about the input shaft 62. The planetary drive assembly 80 includes a sun gear 82 having a plurality of female or internal splines or gear teeth 84 which engage a complementary plurality of male splines or gear teeth 86 on the input shaft 62. The sun gear 82 is thus coupled to the input shaft 62 and rotates therewith. The sun gear 82 includes external or male gear teeth 88 about its periphery. Radially aligned with the sun gear 82 and its teeth 84 is a ring gear 90 having inwardly directed gear teeth 92. The ring gear 90 is retained within the housing assembly 60 by a cooperating circumferential groove and snap ring assembly 94. A plurality of pinion gears 96 are rotatably received upon a like plurality of stub shafts 98 which are mounted within and secured to a planet carrier 100. The planet carrier 100 includes a plurality of female or internal splines or gear teeth 102 disposed generally adjacent the male splines or gear teeth 86 on the input shaft 62. The planetary gear assembly 80 is more fully described in co-owned U.S. Pat. No. 4,440,042 which is herein incorporated by reference.

The planetary drive assembly 80 also include a dog clutch or clutch collar 104 defining female or internal splines or gear teeth 106 which are axially aligned with and, in all respects, complementary to the male splines or gear teeth 86 on the input shaft 62. The clutch collar 104 and its internal splines or gear teeth 106 are slidably received upon a complementary plurality of male or external splines or gear teeth 108 on the stepped output shaft 70. The clutch collar 104 thus rotates with the output shaft 70 but may translate bi-directionally along it. The clutch collar 104 also includes male or external splines or gear teeth 110 on one end which are in all respects complementary to the female splines or gear teeth 102 on the planet carrier 100.

Finally, the dog clutch or clutch collar 104 includes a pair of radially extending, spaced-apart flanges 114 on its end opposite the splines or gear teeth 110 which define a circumferential channel 116. The channel 116 receives a complementarily configured semi-circular throat or yoke 118 of a shift fork 120. The shift fork 120 includes a through passageway defining female or internal threads 122 which engage complementarily configured male or external threads 124 on a rotatable shift rail 126. The shift rail 126 is received within suitable journal bearings or bushings 128 and is coupled to and driven by a rotary electric, pneumatic or hydraulic motor 130. The rotary motor 130 is provided with energy through a line 132.

The end of the shift fork 120 opposite the semi-circular yoke 118 includes a cam 136 having a recess flanked by two projections. A three position sensor 140 having a roller or ball actuator includes proximity or position sensors such as Hall effect sensors which provide outputs in a preferably multiple conductor cable 146 defining a first signal indicating that the shift fork 120 and associated clutch collar 104 is in the neutral position illustrated in FIG. 2; that the shift fork 120 has moved to the left from the position illustrated such that the sensor 140 provides a signal indicating that the clutch collar 104 is in a position which selects high gear or direct drive, effectively by-passing the planetary gear assembly 80, or, conversely, that the shift fork 120 has moved to the right from the position illustrated in FIG. 2 such that the sensor 140 indicates that the shift fork 120 has translated to select the low speed output or speed range of the planetary drive assembly 80. Such translation is achieved by selective bi-directional operation of the drive motor 130 which rotates the shift rail 126 and bi-directionally translates the shift fork 120 along the male threads 124 of the shift rail 126.

Figure 3:
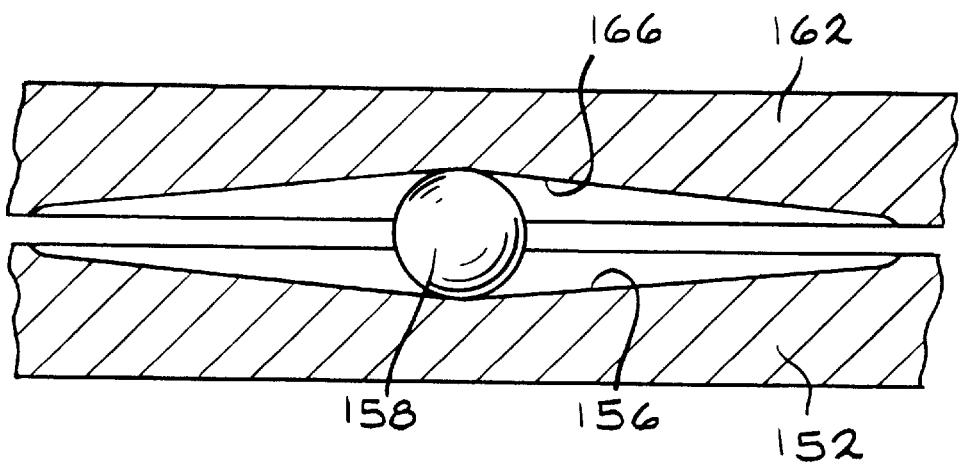
FIG. 3 is a flat pattern development of the ball ramp operator of a transfer case incorporating the present invention taken along line 4—4 of FIG. 2.

The transfer case assembly 16 also includes an electromagnetically actuated disc pack type clutch assembly 150. The clutch assembly 150 is disposed about the output shaft 70 and includes a circular drive member 152 coupled to the output shaft 70 through a splined interconnection 154. The circular drive member 152 includes a plurality of circumferentially spaced apart recesses 156 in the shape of an oblique section of a helical torus, as illustrated in FIG. 3. Each of the recesses 156 receives one of a like plurality of load transferring balls 158.

A circular driven member 162 is disposed adjacent the circular drive member 152 and includes a like plurality of opposed recesses 166 defining the same shape as the recesses 156. The oblique side walls of the recesses 156 and 166 function as ramps or cams and cooperate with the balls 158 to drive the circular members 152 and 162 apart in response to relative rotation therebetween. It will be appreciated that the recesses 156 and 158 and the load transferring balls 158 may be replaced with other analogous mechanical elements which cause axial displacement of the circular members 152 and 162 in response to relative rotation therebetween. For example, tapered rollers disposed in complementarily configured conical helices may be utilized.

The circular driven member 162 extends radially outwardly and is secured to a soft iron rotor 170. The rotor 170 is disposed in opposed, facing relationship with an armature 176. The rotor 170 is U-shaped and surrounds a housing 178 containing an electromagnetic coil 180. A single conductor wire 182 provides electrical energy to the electromagnetic coil 180.

Providing electrical energy to the electromagnetic coil 180 through the wire 182 causes magnetic attraction of the armature 176 to the rotor 170. This magnetic attraction results in frictional contact of the armature 176 with the rotor 170. When the output shaft 70 is turning at a different speed than the armature 176 which turns at the same rotational speed as a secondary output shaft 184, this frictional contact results in a frictional torque being transferred from the output shaft 70, through the circular drive member 152, through the load transferring balls 158 and to the circular driven member 162. The resulting frictional torque causes the balls 158 to ride up the ramps of the recesses 156 and 166 and axially displaces the circular drive member 152. Axial displacement of the circular drive member 152 translates an apply plate 186 axially toward a disc pack clutch assembly 188. A plurality of compression springs 190 provides a restoring force which biases the 15 circular drive member 152 toward the circular driven member 162 and returns the load transferring balls 158 to center positions in the circular recesses 156 and 166 to provide maximum clearance and minimum friction between the components of the electromagnetic clutch assembly 150 when it is deactivated.

The disc pack clutch assembly 188 includes a plurality of interleaved friction plates or discs 192A and 192B. A first plurality of discs 192A are coupled by interengaging splines 194 to a clutch hub 196 which is, in turn, coupled to the output shaft 70 for rotation therewith. A second plurality of discs 192B are coupled to an annular housing 198 by interengaging splines 202 for rotation therewith.

An important design consideration of the components of the electromagnetic clutch assembly 150 is that their geometry, such as the ramp angles of the recesses 156 and 166, the spring rate of the compression springs 190 and the clearances in the disc pack clutch assembly 188 ensure that the electromagnetic clutch assembly 150 is neither self-engaging nor self-locking. The electromagnetic clutch assembly 150 must not self-engage but rather must be capable of controlled, proportional engagement of the clutch discs 192A and 192B and torque transfer in direct, proportional response to the control input.

The annular housing 198 is disposed for free rotation about the output shaft 70 and is rotationally coupled to a chain drive sprocket 204 by a plurality of interengaging lugs and recesses 206. The drive sprocket 204 is also freely rotatably disposed on the output shaft 70. A drive chain 208 is received upon the teeth of the chain drive sprocket 204 and engages and transfers rotational energy to a driven chain sprocket 212. The driven sprocket 212 is coupled to the secondary output shaft 184 of the transfer case assembly 16 by interengaging splines 214.

The transfer case assembly 16 also includes a first Hall effect sensor 220 which is disposed in proximate, sensing relationship with a plurality of teeth 222 on a tone wheel 224. The tone wheel 224 is coupled to and rotates with the primary output shaft 70. A second Hall effect sensor 226 is disposed in proximate, sensing relationship with a plurality of teeth 228 of a tone wheel 230 disposed on the secondary output shaft 184. Preferably, the number of teeth 222 on the tone wheel 224 is identical to the number of teeth 228 on the tone wheel 230 so that identical shaft speeds result in the same number of pulses per unit time from the Hall effect sensors 220 and 226. This simplifies computations and improves the accuracy of all decisions based on such data. As to the actual number of teeth 222 on the tone wheel 224 and teeth 228 on the tone wheel 230, it may vary from thirty to forty teeth or more or fewer depending upon rotational speeds and sensor construction. The use of thirty-five teeth on the tone wheels 224 and 230 has provided good results with the Hall effect sensors 220 and 226.

Figure 4:
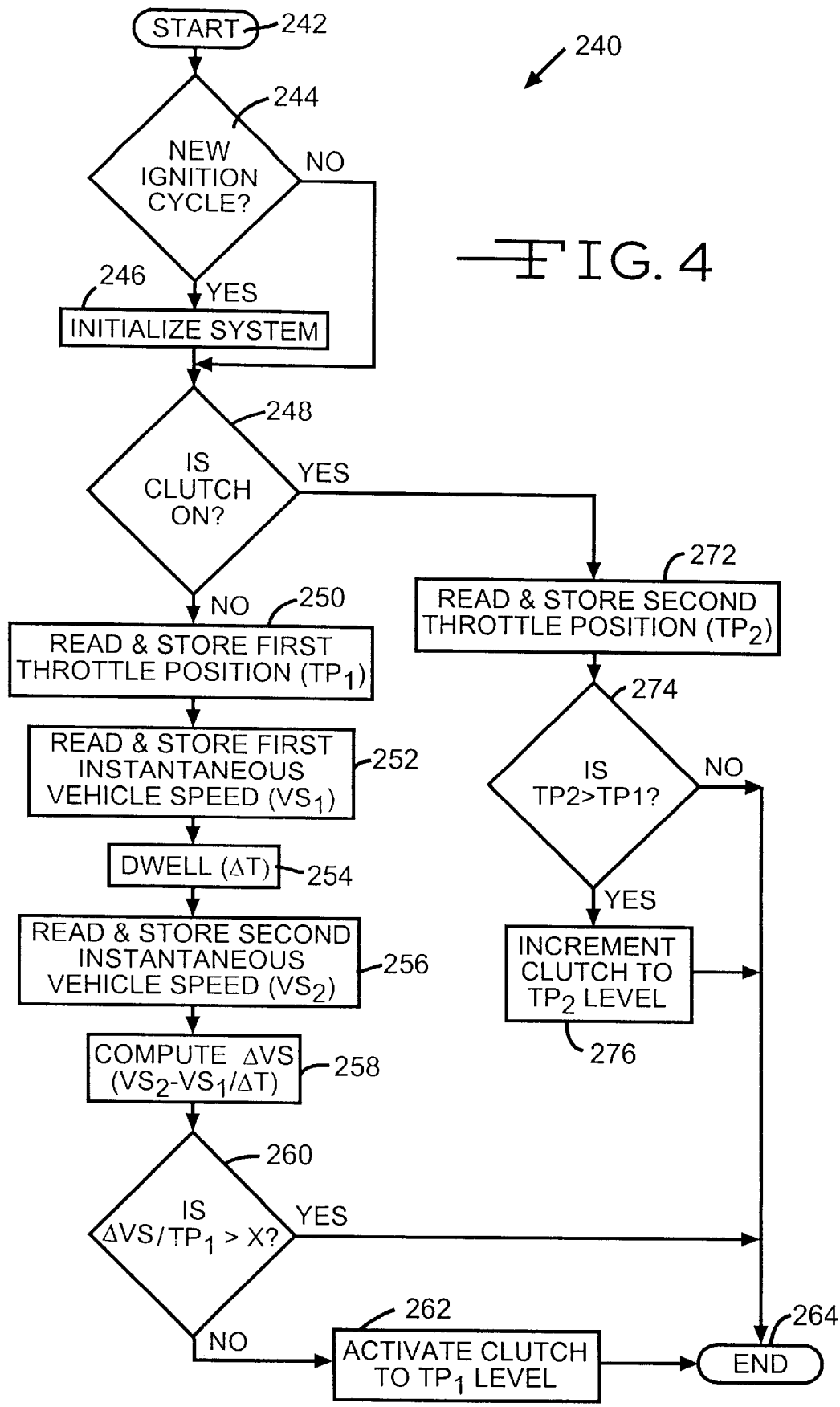
FIG. 4 is a software or computer program flow chart setting forth the operating steps according to the present invention.

Referring now to FIG. 4, the method of operating the transfer case 16 in accordance with information received from the throttle position sensor 56 and one or both of the Hall effect sensors 220 and 226 includes a software subroutine or program 240 stored in memory in the microcontroller 54. The operating method embodied in the program 240 commences at a start point 242 and immediately proceeds to a decision point 244 wherein it is determined whether a new ignition cycle, i.e., a new engine start-up or vehicle use cycle, has begun since the last iteration of the program 240. If it is a new ignition cycle, the decision point 244 is exited at YES and the program 240 proceeds to a process step 246 which initializes the system, erases all previously stored data and sets all temporary memory and counters to zero. If it is not a new ignition cycle, the decision point 244 is exited at NO. The program 240 then moves to a decision point 248 where the electromagnetic disc pack clutch assembly 150 or its electronic driver circuitry (not illustrated) is interrogated to determine if it is energized. If it is, the decision point 248 is exited at YES. If it is not, the decision point 248 is exited at NO and the program 240 moves to a process step 250.

At the process step 250, the instantaneous position of the throttle is read by the throttle position sensor 56 and this information, in either digital or analog form, is provided to the microcontroller 54 through the data line 58. If the throttle position sensor 56 is an analog output device, proper conditioning and conversion of its analog output to a digital signal occurs. The instantaneous position of the throttle position sensor 56 which may take the form of a number from zero to one hundred and thus numerically represent the percent of activation of the throttle is stored in a temporary or volatile memory and the program 240 moves to another process step 252 which reads a first instantaneous speed of the vehicle ($VS_1$). The first instantaneous vehicle speed ($VS_1$) is preferably read from either the first Hall effect sensor 220 associated with the primary drive line 20 or the second Hall effect sensor 226 associate with the secondary drive line 30. Alternatively, the distinct signals from the Hall effect sensors 220 and 226 may be averaged together to provide vehicle speed information, if desired. The first instantaneous speed data ($VS_1$) is then stored in a temporary or volatile memory.

The program 240 then moves to a process step 254 and executes a dwell or hold ($\Delta T$) for a sufficient period of time, preferably on the order of 20 to 100 milliseconds, to ensure an accurate subsequent computation after which a second instantaneous vehicle speed will be read. It will be appreciated that relatively shorter dwell times increase iteration speed of the program 240 but may provide less accurate acceleration data due to the limited time over which the change in vehicle speed is measured. On the other hand, relatively longer dwell times decrease iteration speed of the program 240 but will generally provide more accurate acceleration data due to the greater time over which the change in vehicle speed is measured.

As will be appreciated, the dwell or base line time ($\Delta T$) over which acceleration is computed is not critical and may be selected to conform to other sampling and time intervals in the microcontroller 54. If, for example, the entire program 240 is commenced every 100 or 200 milliseconds, the denominator of the fraction $$\frac{VS_2 - VS_1}{T_2 - T_1}$$

may be, as noted, from 20 to 100 milliseconds and preferably is between 30 and 80 milliseconds. The dwell or hold period of the process step 254 may be accomplished by a conventional programmed timer or subroutine.

After the dwell period of the process step 254 is elapsed, a process step 256 in which a second instantaneous vehicle speed ($VS_2$) is determined and stored is undertaken. The instantaneous vehicle speed information ($VS_1$ and $VS_2$) is then utilized in a process step 258 in which the acceleration ($\Delta VS$) of the motor vehicle is computed. Alternatively, vehicle acceleration ($\Delta VS$) may be determined by the use of an on-board accelerometer or other known detection and computation methods.

Figure 5:
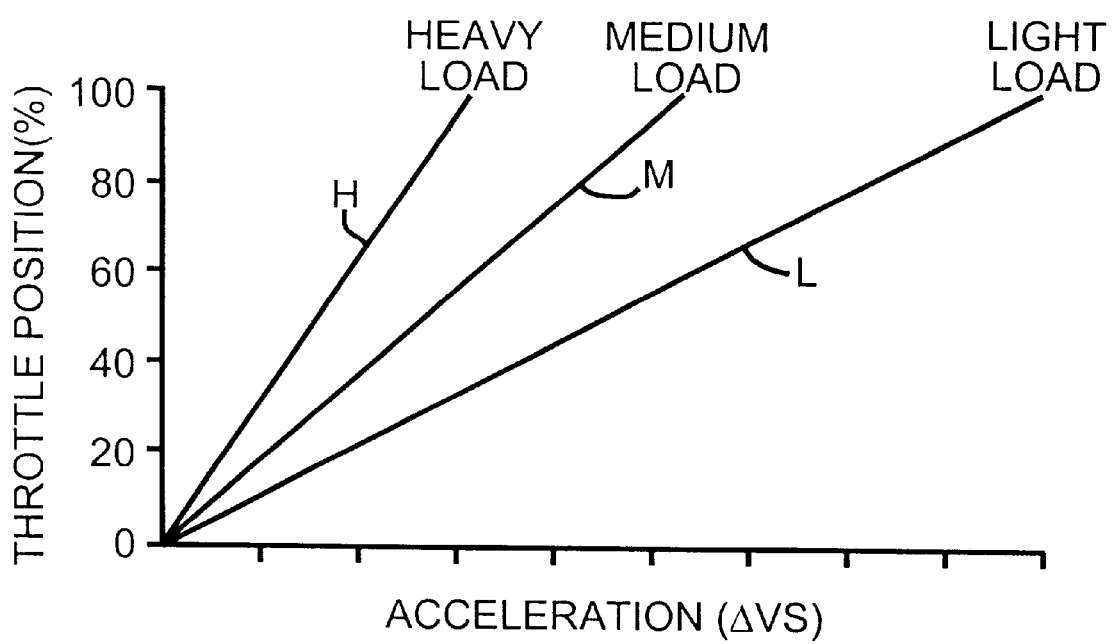
FIG. 5 is a graph presenting a qualitative relationship between throttle position presented in the Y-axis and acceleration presented on the X-axis for three different representative conditions of vehicle loading.

Referring briefly to FIG. 5, a graph qualitatively presenting various relationships between acceleration and throttle position for distinctly loaded vehicles is illustrated. The line L illustrates the performance of a motor vehicle which is lightly loaded, i.e., the acceleration of the vehicle is the greatest or most significant for a given throttle position whereas line H represents a heavily loaded vehicle and illustrates that acceleration is the slowest or lowest for a given throttle position. The line M disposed between the lines L and H represents a vehicle with a medium load and, of course, represents intermediate acceleration for a given throttle position.

The program 240 then moves to a decision point 260 wherein a determination is made whether the instantaneous vehicle acceleration divided by the position of the throttle as sensed by the throttle position sensor 56 is greater than a predetermined value X. The predetermined value X will vary widely based upon empirical and performance data as well as the aggressive or conservative performance goals of a given vehicle and control system. Test track or computer simulated trials of an unloaded or lightly loaded vehicle are undertaken to determine the preliminary value of the vehicle acceleration-throttle position ratio. The value X is preferably 80% (0.8 times) the value of this ratio. While a multiplier of 0.8 has been found to provide optimum operation in typical sport utility vehicles of average torque and horsepower, the multiplier (and thus the final value of X utilized in the decision point 260) may be adjusted up or down within the range of approximately 0.7 to approximately 0.9 to adjust the degree of aggressiveness with which the program 240 responds to throttle position and vehicle acceleration in accordance with design goals.

If the acceleration divided by the throttle position calculation is less than the predetermined value X the decision point 260 is exited at NO and the program 240 enters a process step 262 which activates engagement of the electromagnetic disc pack type clutch assembly 150. The engagement level as a percentage of full (100%) clutch actuation is also a value preferably determined by empirical and actual performance testing of a specific vehicle. One of the more aggressive and most practical schemes of activation of the electromagnetic disc pack type clutch assembly 150 is activation to a level commensurate with the activation of the throttle as sensed by the throttle position sensor 56. That is, if the throttle is activated or depressed to 50% of full travel, the electromagnetic clutch assembly 150 is engaged or activated to 50%. If the throttle is depressed to 90% of full travel, the electromagnetic clutch assembly 150 is engaged to 90% of full engagement. Upon activation of the electromagnetic clutch assembly 150, the process step 262 is exited and the program ends at a step 264 and returns to its executive system or main program.

Returning to the decision point 260, if the instantaneous vehicle acceleration divided by the throttle position is greater than the predetermined value X, the decision point 260 is exited at YES and the program 240 ends at the step 264.

The program 240, of course, is capable of updating and increasing the level of engagement of the electromagnetic clutch assembly 150. This feature is provided by the series of process steps in the program 240 commencing with a YES response to the interrogation undertaken in decision point 248 wherein the status of the electromagnetic clutch assembly 150 is determined. If the electromagnetic clutch assembly 150 is energized, the decision point 248 is exited at YES and the program 240 enters a process step 272 wherein a second throttle position ($TP_2$) is read and stored. The program 240 then moves to a decision point 274 wherein a determination is made as to whether the second throttle position ($TP_2$) is greater than the first throttle position ($TP_1$). If it is not, the decision point 274 is exited at NO and the program 240 ends at the step 264. If the second throttle position ($TP_2$) is greater than the first throttle position ($TP_1$), the decision point 274 is exited at YES and the program 240 enters a process step 276 wherein the electromagnetic disc pack type clutch assembly 150 is incremented to the higher level of engagement corresponding to the percentage of throttle advance of the second throttle position ($TP_2$). When the electromagnetic clutch assembly 150 has been so incremented, the program 240 ends at the step 264 and returns to the executive system or main program.

It should be noted that the program 240 does not include a provision for decrementing, i.e., deactivating the electromagnetic clutch assembly 150. This functional consideration is based upon the fact that once the vehicle has been determined to be heavily loaded, this heavily loaded condition will, under normal circumstances, not change during an ignition, i.e., use, cycle. That is, if it is determined that the vehicle is heavily loaded or towing a trailer during the beginning of an ignition cycle, it will remain so at least until the vehicle is stopped and possibly unloaded.

An alternate design philosophy wherein, for example, fuel economy is of great importance, suggests the benefit of disengaging or deactivating the electromagnetic disc pack clutch assembly 150 if, for example, the vehicle has reached highway speed and no significant acceleration events such as might occur from a stop have occurred for a period of time. In this case, the program 240 may be modified to include a timer which times out a predetermined period of time and a decision point which determines whether the vehicle has recently or is stopped. If the predetermined time has elapsed and if the vehicle has not stopped, the electromagnetic clutch assembly 150 may be disengaged. An accelerative event would, however, re-engage the clutch assembly 150 according to the program 240.

It will be appreciated that the operating method of the present invention is intended to be and is fully capable of adaption and integration into vehicles and control systems which provide on demand or adaptive torque distribution between primary and secondary drive lines when, for example, slip of the primary drive wheels due to loss of traction is detected.

The foregoing disclosure is the best mode devised by the inventor for practicing this invention. It is apparent, however, that apparatus and methods incorporating modifications and variations will be obvious to one skilled in the art of motor vehicle operating strategies. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An operating strategy for an adaptive motor vehicle drive line having a clutch operably disposed between a primary drive line and a secondary drive line comprising the steps of:
   sensing a position of an engine throttle,
   sensing acceleration of a vehicle,
   determining a ratio of acceleration to throttle position,
   comparing said ratio to a predetermined value, and
   activating a clutch to transfer torque from such primary drive line to such secondary drive line when said ratio is less than said predetermined value.

2. The operation strategy of claim 1 wherein sensing acceleration of a vehicle comprises the steps of sensing a first vehicle speed, sensing a second vehicle speed after sensing said first vehicle speed and computing acceleration occurring between said first and said second vehicle speed sensings.

3. The operation strategy of claim 1 wherein said predetermined value is less than value exhibited by an unloaded vehicle.

4. The operation strategy of claim 1 wherein said clutch is activated to a level corresponding to said position of said engine throttle.

5. The operation strategy of claim 1 further including the step of again sensing the position of said engine throttle and increasing clutch engagement if said later sensed throttle position is greater than said earlier sensed throttle position.

6. The operation strategy of claim 1 further including the step of deactivating said clutch after a predetermined time.

7. The operation strategy of claim 1 further including the step of determining whether a new ignition cycle has been commenced.

8. An operating method for a motor vehicle transfer case having a clutch for selectively transferring torque from a first output to a second output, comprising the steps of;
   sensing a position of an engine throttle,
   determining acceleration of such motor vehicle,
   determining whether said vehicle acceleration divided by said sensed position of said engine throttle is less than a predetermined value, and
   activation said clutch when said vehicle acceleration divided by said sensed position of said engine throttle is less than said predetermined value.

9. The operating method of claim 8 wherein determining acceleration of such motor vehicle comprises the steps of sensing a first vehicle speed, sensing a second vehicle speed after said sensing said first vehicle speed and computing a change in such motor vehicle speed over time.

10. The operating method of claim 8 wherein said predetermined value is less than value exhibited by an unloaded vehicle.

11. The operating method of claim 8 wherein said clutch is activated to a level corresponding to said position of said engine throttle.

12. The operating method of claim 8 further including the step of again sensing the position of said engine throttle and increasing clutch engagement if said later sensed throttle position is greater than said earlier sensed throttle position.

13. The operating method of claim 8 further including the step of deactivating said clutch after a predetermined time.

14. The operating method of claim 8 further including the step of determining whether a new ignition cycle has been commenced.

15. An operating method for an adaptive motor vehicle drive line having a primary drive line and a secondary drive line comprising the steps of:
   providing a throttle position sensor,
   sensing a position of said throttle,
   providing a vehicle speed sensor,
   sensing speeds of said vehicle and computing acceleration of said vehicle,
   determining whether a ratio of vehicle acceleration to sensed throttle position is less than a predetermined value,
   providing a clutch adapted to transfer torque from such primary drive line to such secondary drive line, and
   activating said clutch if said ration is less than said predetermined value.

16. The operating method of claim 15 wherein sensing acceleration of a vehicle comprises the steps of sensing a first motor vehicle speed, sensing a second motor vehicle speed after sensing said first motor vehicle speed and computing a change in speed per time.

17. The operating method of claim 15 wherein said predetermined value is less than a value exhibited by an unloaded vehicle.

18. The operating method of claim 15 wherein said clutch is activated to a level corresponding to a level of throttle advance.

19. The operating method of claim 15 further including the step of again sensing the position of said throttle and increasing clutch engagement if said later sensed throttle position is greater than said earlier sensed throttle position.

20. The operating method of claim 15 further including the step of deactivating said clutch after a predetermined time.

21. An apparatus for controlling torque delivery in a four-wheel drive motor vehicle comprising, in combination,
- a transfer case having a primary output, a secondary output, and a modulatable clutch for engaging said secondary output to said primary output,
- at least one speed sensor for sensing the speed of such motor vehicle,
- a throttle position sensor for sensing the position of a throttle of such motor vehicle, and
- a microcontroller for receiving data from said vehicle speed sensor and said throttle position sensor, determining the acceleration of such vehicle and engaging said clutch when the ratio of vehicle acceleration to throttle position is less than a predetermined value.

22. The apparatus of claim 21 wherein said vehicle speed sensor is disposed in said transfer case.

23. The apparatus of claim 21 wherein said clutch is activated to a level corresponding to the level of activation of such throttle.

24. The apparatus of claim 21 wherein said microcontroller disengages said clutch after a predetermined period of time.

* * * * *